US006721270B1

United States Patent
Mitra et al.

(10) Patent No.: US 6,721,270 B1
(45) Date of Patent: Apr. 13, 2004

(54) MULTICOMMODITY FLOW METHOD FOR DESIGNING TRAFFIC DISTRIBUTION ON A MULTIPLE-SERVICE PACKETIZED NETWORK

(75) Inventors: Debasis Mitra, Summit, NJ (US); Kajamalai Gopalaswamy Ramakrishnan, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/370,826

(22) Filed: Aug. 9, 1999

(51) Int. Cl.[7] .......................... H04L 12/28; H04L 12/56
(52) U.S. Cl. .................. 370/230; 370/235; 370/252; 370/395.53; 709/224; 709/240
(58) Field of Search .................. 370/217, 218, 370/229, 230, 233–335, 237, 252, 253, 351, 389, 395.1, 395.21, 395.42, 395.53, 400; 709/104, 105, 223–229, 238–242

(56) References Cited

U.S. PATENT DOCUMENTS

| | | | | |
|---|---|---|---|---|
| 5,854,903 | A | * 12/1998 | Morrison et al. | 709/249 |
| 6,304,639 | B1 | * 10/2001 | Malomsoky et al. | 379/112.04 |
| 6,353,616 | B1 | * 3/2002 | Elwalid et al. | 370/443 |
| 6,463,058 | B1 | * 10/2002 | Okeson et al. | 370/385 |
| 6,493,317 | B1 | * 12/2002 | Ma | 370/237 |
| 6,538,991 | B1 | * 3/2003 | Kodialam et al. | 370/229 |
| 6,584,071 | B1 | * 6/2003 | Kodialam et al. | 370/238 |
| 6,594,268 | B1 | * 7/2003 | Aukia et al. | 370/400 |

FOREIGN PATENT DOCUMENTS

GB 0773698 5/1997

OTHER PUBLICATIONS

D. Mitra, et al., "Virtual Private Networks: Joint Resource Allocation and Routing Design," *Proceedings IEEE INFO-COM*, pp. 480–490 (1999).

D. Mitra, et al., "ATM Network Design and Optimization: A Multirate Loss Network Framework," *IEEE/ACM Transactions on Networking* 4, pp. 531–543 (1996).

* cited by examiner

*Primary Examiner*—Hassan Kizou
*Assistant Examiner*—Ahmed Elallam
(74) *Attorney, Agent, or Firm*—Martin A. Finston (57) ABSTRACT

A method is described for solving traffic engineering problems in a network. In one aspect, the invention is used in a network that has at least one QoS service class and at least one class of service that is not a QoS class. Bandwidth is allocated to service routes in the QoS service class so as to optimize a figure of merit such as network revenue. Then a new allocation is made so as to minimize network usage without departing too far from the optimal value of the figure of merit. A residual network consists of that bandwidth that remains unallocated, on each link of the network. Bandwidth for non-QoS traffic is allocated to routes on the residual network. In a second aspect, the invention involves the use of optimization techniques to allocate bandwidth among service routes in one or more service classes in response to a set of demands in each class. The demands are calculated so as to take into account an effective bandwidth associated with the pertinent class, and so as to make allowance for the stochastic behavior of the traffic demands that occur in practice.

33 Claims, 4 Drawing Sheets

MULTICOMMODITY FLOW METHOD FOR DESIGNING TRAFFIC DISTRIBUTION ON A MULTIPLE-SERVICE PACKETIZED NETWORK

FIELD OF THE INVENTION

This invention relates to methods for distributing traffic among routes in packetized communication networks.

ART BACKGROUND

Communication networks transport information between terminal communication devices such as computer terminals, telephones, facsimile machines, and computer file servers. A typical network includes switching nodes such as nodes 10.1–10.8 of FIG. 1, interconnected by links, such as links 15.1–15.10 of the figure. Generally, each terminal device (not shown) is associated with one of the nodes.

In many modern networks, the information to be transported from a source node to a destination node is divided into packets or cells. In accordance, for example, with Asynchronous Transfer Mode protocols (ATM) or Internet Protocol (IP), these, e.g., packets stream independently through the network from the source node to the destination node. At each node encountered along the way, a packet is directed into one link or another according to header information borne by that packet. We will refer to any such network as a "packetized" network.

Some communicative transactions, such as telephone calls, are highly sensitive to the timing of the packet arrivals at the destination. If there are significant absolute or relative delays, or if the packets arrive out of order, the quality of the call may be deemed unacceptable. To preserve the quality of transactions of this kind, it is desirable to maintain a complete route from the source to the destination for the entire duration of the transaction. (We will refer to communicative transactions, generally, as "calls," even if they involve the transmission of fax images, data, etc.)

In all but the simplest networks, more than one route will generally be available from a given source to a given destination. For example, it will be apparent from FIG. 1 that there are five potential routes from node 10.3 to node 10.4. However, it is not always desirable to make available every potential route for a given source-destination pair. For example, some routes may pass through an excessive number of links (i.e., they have many "hops"), which add an unacceptable cumulative delay. The problem is compounded by the fact that each link has a limited amount of bandwidth. Therefore, routing a call between nearby nodes through a far distant link may exclude some traffic between nodes that are situated close to that link. The result may be to force some of that traffic onto undesirably long routes as well.

The discipline referred to as "traffic engineering" deals, inter alia, with the problem of how to distribute traffic among permissible routes. This distribution is desirably made in a manner directed toward a desired level of network performance. Traffic engineering problems are further complicated when the network is required to carry more than one class of service. For example, the same network may be required to carry voice, video, fax, and e-mail transmissions. Each of these services has its own bandwidth requirements, and each has its own requirements as to how much delay can be tolerated. Each may also have its own requirements as to how much call blocking can be tolerated. A network that carries more than one class of service is here referred to as a "multiservice network."

Network traffic can be broadly divided into two categories: Quality-of-Service (QoS) traffic, and Best-Effort (BE) traffic.

QoS traffic is traffic which must satisfy critical requirements in order to be acceptable to customers. Such requirements typically relate to the maximum acceptable delay. However, they may involve other performance parameters. For example, parameters related to blocking could be important. Parameters of that type include the call-loss ratio and the packet-loss ratio. It often happens that in order to satisfy QoS requirements, the pertinent traffic must be limited to certain sets of admissible routes. This notion of admissible route sets makes it convenient, within QoS methodologies, to define admissible route sets that are limited so as to comply with policy constraints of various kinds.

QoS traffic can be further subdivided into real-time traffic, and non-real-time traffic. Real-time traffic, which includes, e.g., voice and video traffic, is meant to be utilized by the customer as it arrives. Any delays which the customer perceives as disrupting the smooth flow of received data will generally be unacceptable. Non-real-time traffic, which includes, e.g., traffic to and from facsimile machines, is more tolerant of delay, but it still must meet customer expectations of prompt and relatively smooth delivery. In particular, premium data traffic might have critical limitations on the call-loss ratio and packet-loss ratio.

BE traffic, which includes, e.g., World Wide Web traffic, e-mail, and FTP, is still more tolerant of delay as well as call blocking. The user is generally satisfied to wait minutes, or in some cases, even hours, to receive a complete message. Therefore, the network service provider is not expected to guarantee any particular limits on the maximum delay. Instead, it is generally sufficient for the network to use bandwidth, as it becomes available, that can be spared without blocking more lucrative QoS traffic.

In order for network service providers to most fully exploit their multiservice networks, it is desirable for them to offer guarantees to their customers that limits on, e.g., the amount of delay, specified variously for different service classes, will be met. However, it is difficult to design a network that will honor such guarantees without blocking an undue amount of traffic. For example, if voice traffic is concentrated on certain links because they are essential for the shortest routing of voice calls, facsimile transmissions may be excluded from these links. If these links are necessary for the routing of facsimile transmissions, the result will be a busy signal whenever an attempt is made to send a facsimile.

One approach to traffic engineering in multiservice networks is described in D. Mitra, et al., "ATM Network Design and Optimization: A Multirate Loss Network Framework," *IEEE/ACM Transactions on Networking* 4 (August 1996) 531–543. This paper describes a software package referred to as TALISMAN. Among other things, TALISMAN solves a joint routing problem in multiservice ATM networks so as to maximize a performance measure that may be characterized as the long-run average revenue for the network. (A joint routing problem is one that jointly treats all pertinent source-destination pairs.) In the TALISMAN model, a revenue figure is obtained for each service route (i.e., a route in association with a given service class) as the product of a service-route revenue parameter, times the intensity of accepted traffic on that service route. Traffic intensity is defined as the arrival rate of calls, times the mean holding time per call. These revenue figures are summed over all streams and, for each stream, over all service routes, to obtain the total network revenue. A stream is defined as a source-destination pair in association with a given service class.

There is a growing demand for multiservice networks in which the route sets available to different service classes must satisfy distinct policy requirements. In addition to traditional requirements related, e.g., to bandwidth and delay, there are further requirements related to virtual private network services, which are also in growing demand.

Generally, as the size and complexity of networks increases, the time required to solve traffic engineering problems also increases. In order to make the most efficient use of a network in the face of changing traffic patterns, it is desirable to carry out on-line solutions of traffic engineering problems; that is, solutions that are responsive to actual conditions as they occur. Even with the help of tools such as TALISMAN, this is not always feasible for networks that are large or complex.

SUMMARY OF THE INVENTION

We have invented a method for solving traffic engineering problems in a network having at least one QoS service class and at least one class of service that is not a QoS class. The computational complexity of our method is polynomial, so that there are feasible solutions even for networks having hundreds of nodes and many service classes. When applied to networks of typical size, our method will be fast enough, in many cases, to perform on-line.

In accordance with our method, bandwidth is allocated to respective service routes in at least one QoS service class. We are using the term "QoS" in a broad sense, to include any class of service receiving priority treatment. Both delay-sensitive and delay-insensitive traffic may be QoS traffic, in this sense. The bandwidth allocation is made in response to a given set of demands for bandwidth, in the QoS class, between each source-destination pair. Linear programming methods, such as Multicommodity Flow (MCF) techniques, are used to make this allocation in such a way as to optimize a suitable figure of merit, such as network revenue.

Then, linear programming methods are again used to make a new allocation, which minimizes network usage without departing from the optimal value of the figure of merit. Then, a residual network is identified. The residual network consists of that bandwidth that remains unallocated, on each link of the network.

A routing problem is then solved for at least one non-QoS service class. Without limitation, all such service classes are here referred to as BE classes. The routing problem is solved to find route sets for all flows in the BE service class, and to allocate bandwidth to the respective service routes in each of these route sets. This problem is solved using linear programming techniques in such a way as to optimize a suitable figure of merit, such as network revenue from best-effort traffic.

The priority of the QoS classes is enforced by routing QoS demands before, and without regard to, the BE demands. Typically, the effective bandwidths associated with the QoS services are larger than those of the BE classes. Both of these factors will generally lead to lower delay, and to lower rates of call blocking and packet loss, in the QoS traffic relative to the BE traffic.

In preferred embodiments of the invention, the routing problem for the QoS classes is solved using a route-based formulation so that specifications of limited, admissible route sets are readily accommodated. By contrast, the routing problem for the BE classes is preferably solved using a link-based formulation. (Such a formulation is sometimes referred to as "edge-based.") A link-based formulation provides improved speed when problems are solved on highly connected networks. However, the link-based formulation alone does not lead to a complete solution. In a given service class, it leads to a link-by-link allocation of bandwidth associated with respective source-destination pairs, but it does not provide an allocation by service route. A further procedure, referred to as route decomposition, is used to construct, from the link-based solution, an allocation of bandwidth by service route.

In another aspect, the invention involves the use of linear programming techniques, as described above, to allocate bandwidth among service routes in response to a set of demands in each pertinent service class. Significantly, the demands are calculated so as to take into account an effective bandwidth associated with the pertinent service class, and so as to make allowance for the stochastic behavior of the traffic demands that occur in practice.

It should be noted that the traffic engineering problem that is solved by the invention in either aspect is a combined problem of routing and admission control. The routing aspect takes place explicitly as demand between a given source-destination pair in a given service class is allocated among its admissible routes. The admission-control aspect takes place implicitly when the optimum such allocation is an allocation of less than all the demand. Simply stated, admission control operates when traffic is dropped in order, e.g., to maximize revenue.

GLOSSARY OF SYMBOLS AND TERMINOLOGY

A network has N nodes and L links. Each link is associated with a respective value of the index l.

A service class is denoted by s.

A source-destination pair is denoted by $\sigma$.

A stream (s, $\sigma$) is a source-destination pair in association with a specific service class.

Each route (between a source-destination pair) is identified by an index r.

The set of permissible routes for a given stream (s, $\sigma$) is denoted $\Re(s, \sigma)$.

A service route (s, r) is a route r in association with a particular service class s.

The demand matrix $T_s$ is the N×N matrix of bandwidth demands $T_{s,\sigma}$ between source-destination pairs $\sigma$ in service class s. The entries of the demand matrix are typically based on traffic measurements or predictive models, or specified in service-level agreements for, e.g., virtual private networks. There is a demand matrix for each QoS service class, and there is also a demand matrix $T_{BE}$ for best-effort traffic.

$C_l$ is the bandwidth or capacity of link l.

The QoS revenue parameter $e_{sr}$ is the earnings per unit carried bandwidth on a given QoS service route.

The best-effort revenue parameter $e_{BE,\sigma}$ is the earnings per unit carried bandwidth of total BE traffic between a given source-destination pair. We assume here, for simplicity, that this earnings rate is independent of the choice of route. Generalizations to cases of route-dependent earnings are readily achieved, and also fall within the scope of the present invention.

$X_{sr}$ is the flow, or carried bandwidth, on a given service route.

$F_\sigma$ is the total BE flow, or carried bandwidth, between a given source-destination pair.

$W_{QoS}$ is the total network revenue for all QoS service classes. It is computed by summing the product $e_{sr} X_{sr}$ over all QoS service classes, over all source-destination pairs, and for each pertinent stream, over the route set (i.e., the set of permissible routes) for that stream:

$$W_{QoS} = \sum_{QoS\ classes\ s} \sum_{\sigma} \sum_{r \in R(s,\sigma)} e_{sr} X_{sr}. \quad \text{(Eq. 1)}$$

$W_{BE}$ is the total network revenue for BE traffic. It is computed by summing the product $e_{BE,\sigma} F_\sigma$ over all source-destination pairs:

$$W_{BE} = \sum_{\sigma} e_{BE,\sigma} F_\sigma. \quad \text{(Eq. 2)}$$

In Equation 2, we are assuming, for simplicity, that there is only one BE class of service. Generalizations to cases having multiple BE classes are readily achieved, and also fall within the scope of the present invention.

DETAILED DESCRIPTION

Figure 2:
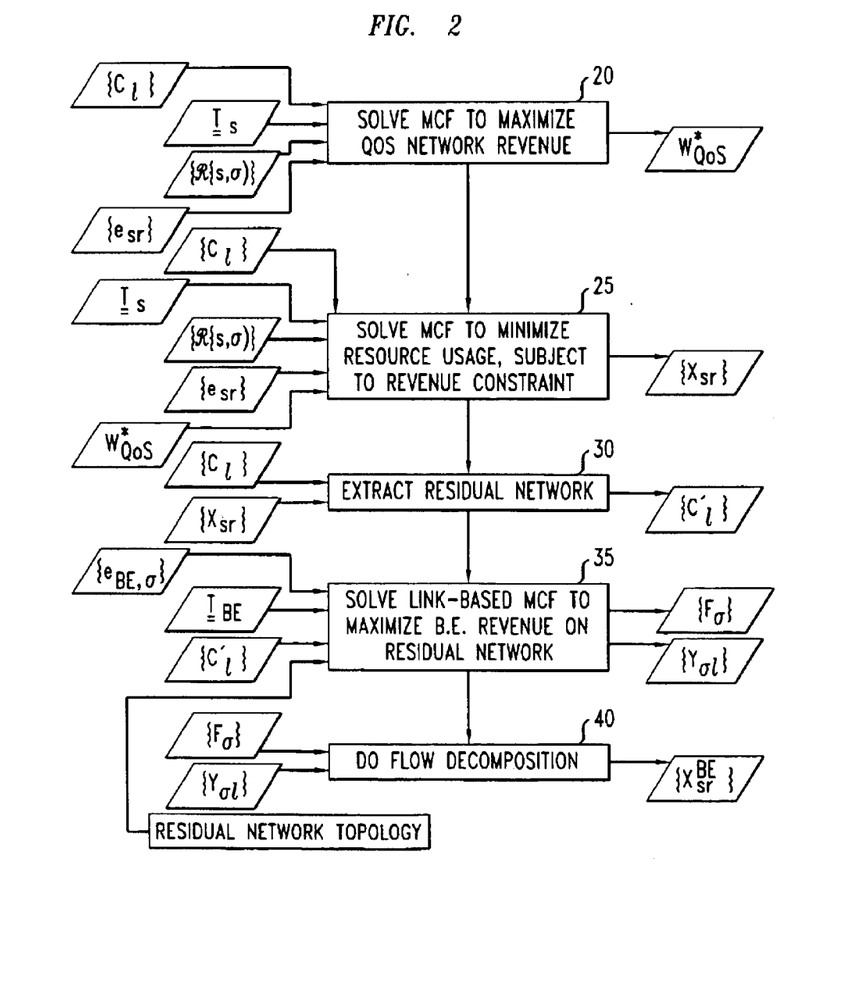
FIG. 2 is a flowchart of a traffic engineering procedure in accordance with the invention in a broad illustrative embodiment.

According to the illustrative embodiment of the invention depicted in FIG. 2, a multicommodity flow (MCF) problem is solved, as indicated at block 20, to find the flows $X_{sr}$ on respective service routes that maximize network QoS revenue. Inputs to the problem are the QoS demand matrices, the link capacities, the route set for each QoS stream, and the revenue parameters for the various QoS service routes. The maximization is performed subject to the constraints that: (i) for a given stream, the sum of all flows $X_{sr}$ over the route set for that stream must not exceed the demand $T_{s,\sigma}$ associated with that stream; (ii) the flows $X_{sr}$ must all be non-negative; and (iii) the sum of all flows routed over a given link must not exceed the capacity of that link.

Mathematically, the MCF problem of block 20 is stated by:

$$W_{QoS}^* = \max_{\{X_{sr}\}} W_{QoS}, \text{ subject to:} \quad \text{(Eq. 3)}$$

$$\sum_{r \in R(s,\sigma)} X_{sr} \le T_{s,\sigma} \text{ for all } QoS \text{ service classes } s \text{ and for all } \sigma,$$

$X_{sr} \ge 0$ for all $r \in R(s, \sigma)$, for all $QoS$ service classes $s$ and for all $\sigma$, and $$\sum_{QoS\ classes\ s} \sum_{\sigma} \sum_{r \in R(s,\sigma):l \in r} X_{sr} \le C_l \text{ for all } l.$$

In reference to the first of the above constraints, it should be noted that for at least some streams, it may be possible that the sum of all flows over the pertinent route set may be less than the associated demand. That is, admission control may operate to deny some of the requested bandwidth. For a given stream (s, σ), a corresponding loss ratio $L_{s\sigma}$ may be defined by:

$$L_{s\sigma} = \frac{T_{s,\sigma} - \sum_{r \in R(s,\sigma)} X_{sr}}{T_{s,\sigma}}. \quad \text{(Eq. 4)}$$

The MCF problem of block 20 is solved to determine $W_{QoS}^*$, which is an optimal value of the total QoS network revenue. It should be noted that a different figure of merit, such as total carried QoS traffic, is readily substituted for QoS network revenue in the MCF problem.

In block 25, a second MCF problem is solved. All of the inputs to the first MCF problem are also inputs to this second MCF problem. In addition, the value of $W_{QoS}^*$ obtained from the solution to the previous MCF problem is now applied as a constraint. That is, the MCF problem of block 25 must be solved such that the total network revenue (or other figure of merit) is not less than $W_{QoS}^*$, or not less than a figure derived from $W_{QoS}^*$. An exemplary such derived figure is a fractional value of $W_{QoS}^*$, less than but near in value to $W_{QoS}^*$. The object of the MCF problem of block 25 is to minimize the total resource utilization, obtained by summing bandwidth-hops, of the QoS traffic. The total resource utilization $U_{QoS}$ by QoS traffic is expressed mathematically by the equation $$U_{QoS} = \sum_{l} \sum_{\substack{(s,\sigma) \\ s.t.\ l \in r}} \sum_{r \in R(s,\sigma)} X_{sr}, \quad \text{(Eq. 5)}$$

where the first summation is taken over links, the second over streams, and the third over routes in the pertinent route set, but only those routes that contain a given link l. $U_{QoS}$ is the objective function which is to be minimized subject to the revenue constraint.

In alternate approaches, different measures of the efficiency of resource utilization can be optimized. For example, one alternate approach would be to minimize the usage of the most heavily utilized link.

In other alternate approaches, a constraint is applied to prevent saturation of the most heavily used links. Such a constraint would, e.g., cap the utilization of a given link at a stated fraction of the total link capacity.

The output of block 25 includes the set $\{X_{sr}\}$ of flow parameters on all of the service routes that minimizes $U_{QoS}$. At block 30, the capacity $C_l$ of each link l is reduced by every flow $X_{sr}$ routed over that link. The remaining capacity is denoted $C_l'$. The set $\{C_l'\}$ of all remaining capacities $C_l'$ is referred to as the "residual network."

At block 35, a further MCF problem is solved, to maximize the total network revenue (or other figure of merit) from best-effort traffic. For purposes of solving this MCF problem, the network is defined as the residual network $\{C_l'\}$. Thus, the inputs to block 35 are the best-effort demand matrix $T_{BE}$, the set $\{C_l'\}$, and the set of earnings parameters $\{e_{BE,\sigma}\}$.

It should be noted that in the preceding discussion, the MCF problems of blocks 20 and 25 were formulated as route-based problems. That is, the decision variables $X_{sr}$ relate to the flow on given service routes, but are not separately specified for individual links. It is well known that an alternative formulation for MCF problems is the so-called link-based (or edge-based) formulation, in which each decision variable $Y_{\sigma l}$ expresses flow, between a given source-destination pair σ, on a given link l.

The route-based formulation is advantageous for treating the QoS traffic, because it conveniently allows for distinct policy constraints, as well as delay-related constraints, to be applied to the routes for different source-destination pairs and different service classes. These constraints may include, for example, limits on the total permissible hop count. Such constraints are useful for assuring that total delay, or some other measure of quality, remains within desired bounds. Significantly, policy constraints and other constraints tend to limit the number of permissible routes for a given source-destination pair and service class.

However, in a highly interconnected network with many permissible routes in each route set, the route-based formulation tends to become very complex. In such a case, solving the MCF problem in the route-based formulation may be intractable, in a practical sense. On the other hand, the complexity of the link-based formulation is independent of the number of routes, and depends only on the number of links and nodes. Thus, the link-based formulation may be advantageous when the route sets are large.

Unlike QoS traffic, best-effort traffic will not typically be subject to policy constraints such as an upper bound on the permissible number of hops in a route. Thus, within the limitations of the residual network, the route sets for best-effort traffic may be quite large, and in at least some cases they will be free of a priori restrictions. Consequently, we believe that it will generally be preferable to solve the MCF problem of block 35, for best-effort traffic, using the link-based formulation.

The object of the MCF problem of block 35 is to determine the set $\{Y_{\sigma l}\}$ of best-effort flow parameters that maximize the total network best-effort revenue $W_{BE}$, subject to the constraints that: (i) the total flow $F_\sigma$ between each source-destination pair σ must be non-negative and no greater than the corresponding best-effort demand $T_{BE,\sigma}$; (ii) for each source-destination pair, the sum of flow parameters $Y_{\sigma l}$ taken over links entering a given node must equal the sum taken over links leaving the given node, unless the node is a source or destination, in which case the two sums differ by +1 (if a destination) or −1 (if a source) times the total flow $F_\sigma$; (iii) all flow parameters must be non-negative; and (iv) for each link l, the sum over all source-destination pairs σ of the flow parameters $Y_{\sigma l}$ must not exceed the link capacity $C_l$.

Those skilled in the art will appreciate that the formulation for this problem that is described here is the so-called "$N^2L$" formulation. In at least some cases, an alternate formulation, known as the "N-Commodity" formulation, will offer the advantage of greater computational efficiency. A description of this alternate formulation may be found, e.g., in U.S. Pat. No. 5,596,719, issued on Jan. 21, 1997 and commonly assigned herewith, beginning at column 5, line 60.

Similarly to the case of QoS traffic, a best-effort loss ratio due to admission control may be defined as $$\frac{T_{BE,\sigma} - F_\sigma}{T_{BE,\sigma}}.$$

In order to apply the results of block 35, it is necessary to recover from the optimal set $\{Y_{\sigma l}\}$ a corresponding set $\{X_{sr}^{BE}\}$ of route-based best-effort flow parameters. The procedure for achieving this is referred to as flow decomposition. At block 40, flow decomposition is carried out to derive the set $\{X_{sr}^{BE}\}$ from the input set $\{F_\sigma\}$ of total flows for the respective source-destination pairs and from the input set $\{Y_{\sigma l}\}$ of link-based flow parameters.

Figure 3:
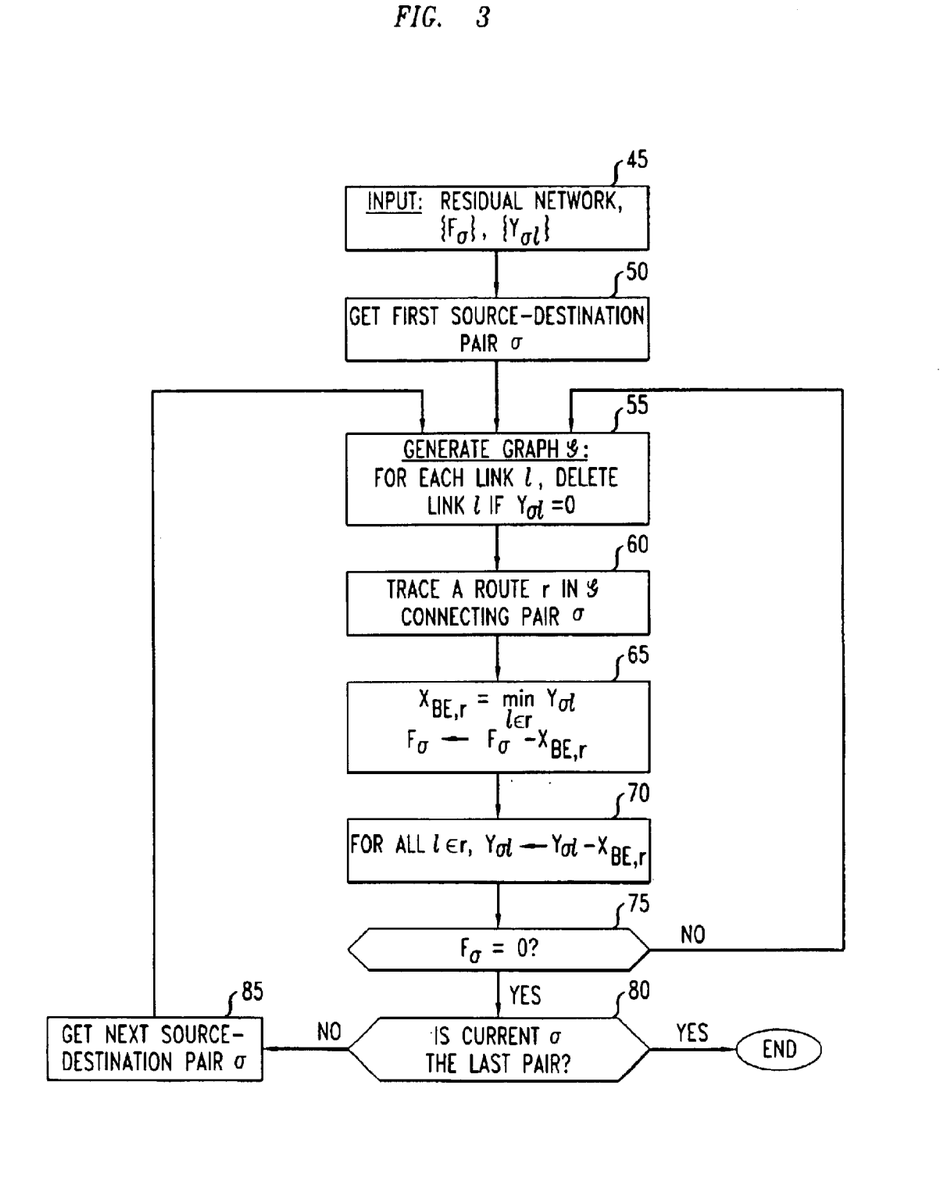
FIG. 3 is a flowchart of a flow-decomposition procedure useful for the practice of the invention in some embodiments.

Methods for performing flow decomposition are well known in the art. One exemplary method is illustrated in FIG. 3 and will now be described.

At block 45, the sets $\{C_l\}$, $\{F_\sigma\}$, and $\{_{\sigma l}\}$ are accepted as input. At block 50, an initial source-destination pair σ is obtained for processing. Each source-destination pair will be processed, in turn, until there are none left, as indicated by blocks 80 and 85.

At block 55, a reduced graph g(σ) is generated by deleting, from the residual network, each link that carries no flow between the current source-destination pair σ. At block 60, a route r is traced connecting the current source-destination pair. At block 65, the best-effort, route-based flow parameter $X_{BE,r}$ for the current route is assigned a value equal to the smallest link-based flow parameter on any link of the current route. That is, it is assigned the value $$\min_{l\in r} Y_{\sigma l}.$$

Also at block 65, the total flow value $F_\sigma$ for the current source-destination pair is reduced by the quantity $X_{BE,r}$.

As noted, at block 60 a particular route r was traced in g(σ) connecting the current source-destination pair. At block 70, the link-based flow parameter $Y_{\sigma l}$ on each link of this route r is reduced by the quantity $X_{BE,r}$.

As indicated at block 75, the procedures of blocks 55–70 are iterated, for the current source-destination pair, until the total flow value $F_\sigma$ for that source-destination pair is reduced to zero; that is, until all of the flow between that pair of nodes has been assigned to routes. Then, as indicated at blocks 75–85, a new source-destination pair is obtained, and the procedure of blocks 55–70 is repeated. The entire procedure is repeated for each remaining source-destination pair until there remain no unprocessed source-destination pairs.

It should be noted that in each iteration of block 55 (for a given source-destination pair σ), the reduced graph g(σ) is further reduced from its condition in the preceding iteration. However, when a new source-destination pair is obtained, the initial graph g(σ) is again the entire residual network.

After the route-based flow-parameter sets $\{X_{sr}\}$ and $\{X_{sr}^{BE}\}$ have been obtained, they can be used for allocating the offered traffic in each stream among the permissible routes in the route set for that stream. In an exemplary allocation scheme, the fraction of traffic offered to a given route is approximately equal to $X_{sr}$ for that route, divided by the sum of the $X_{sr}$'s over all routes in the route set. Those skilled in the art will appreciate that such a scheme is readily carried out, e.g., through proportional routing at the source node, in conjunction with weighted fair queuing at the various nodes of the network.

Proportional routing and weighted fair queuing are well known in the art, and need not be described here in detail. For pedagogical purposes, however, we now provide a brief description of proportional routing. Each node is a prospective source node for each of N–1 source-destination pairs in each of the S service classes, and thus is a prospective source node for each of S(N–1) streams. A plurality of routes may correspond to each of these streams, each route having a relative share $$\frac{X_{sr}}{T_{s\sigma}}$$

of the traffic demand $T_{s,\sigma}$. In this regard, the dropping of a call is also treated as a route assignment (to a phantom route) having such a relative share. Loaded into the router at each node are S(N–1) tables, one for each stream. Listed in each table are the values of the fractions $$\frac{X_{sr}}{T_{s\sigma}}$$

for the pertinent service routes. Call demands are allocated among these service routes, including the phantom route, in proportion to the fractions $$\frac{X_{sr}}{T_{s\sigma}}.$$

In some implementations of the method that we have described with reference to FIG. 2, the traffic demands $T_{s,\sigma}$ are mean values obtained by measurement, or by projection from a traffic model. If a traffic model is used for this purpose, it is preferably a stochastic model, because such a model more accurately accounts for the statistical nature of communication traffic.

However, such a use of mean values may lead to undesirable rates of loss. That is precisely because communication traffic is statistical in nature. In practice, demands do not occur uniformly, but instead tend to occur in bunches separated by periods of relatively low activity. If it is assumed that demands occur uniformly, the traffic engineering that results may fail to provide enough capacity to accommodate the periods of relatively high activity, when demands arrive in bunches. As a consequence, offers of traffic to particular routes may have to be refused because capacity is insufficient on one or more links of such routes. Such a refusal would lead to loss of a call.

We have devised an approach that promises to reduce the loss rate by accounting for stochasticity in call arrivals while maintaining computational tractability even for large networks. We here describe our approach as applied to QoS traffic. Optionally, it can also be applied to best-effort traffic.

Our approach involves certain quantities associated with the stochastic modeling of communication networks. They are summarized below:

The mean arrival rate of calls of a given stream (s, σ), exemplarily in a Poisson process, is denoted $\Lambda_{s\sigma}$.

The mean holding period of a call of the given stream is denoted $1/\mu_{s\sigma}$.

The load, or traffic intensity, of the given stream is denoted $\bar{\rho}_{s\sigma}$. This quantity is equal to $\Lambda_{s\sigma}/\mu_{s\sigma}$.

The quantities $\Lambda_{s\sigma}$, $1/\mu_{s\sigma}$, and the effective bandwidths $d_s$ are generally considered to be inputs to the stochastic model of the network. The effective bandwidth is a parameter that subsumes the effects of packet-level variability, buffer overflow, buffer delay, and other packet-level QoS-sensitive effects and descriptors of traffic behavior.

The design procedure that we discuss below results in a further quantity $\rho_{sr}$. This is the load, or traffic intensity, on a given service route (s, r). The quantities $\rho_{sr}$ are analogous to the flow parameters $X_{sr}$ discussed above. Once they have been obtained, the quantities $\rho_{sr}$ can be used in a traffic engineering procedure. One such procedure, for example, is analogous to the procedure described above in which the flow parameters $X_{sr}$ are used to allocate traffic over the pertinent route set.

Figure 4:
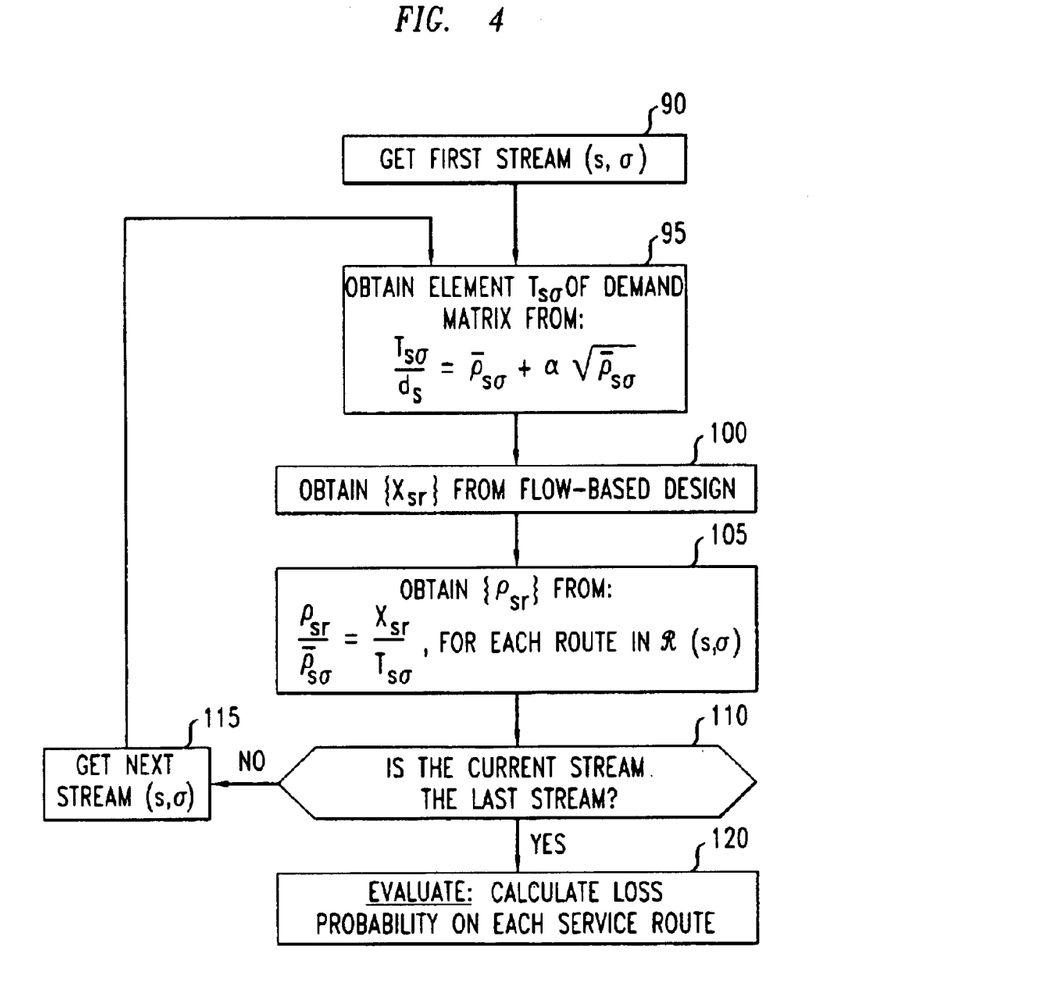
FIG. 4 is a flowchart of an extension of the procedure of FIG. 2, leading to bandwidth allocations that take into account the stochastic nature of network traffic.

FIG. 4, to which reference is now made, shows a procedure that is iterated for each stream, in turn, until no further streams are left. At block 90, the first stream is obtained. At block 95, the element $T_{s,\sigma}$ of the demand matrix $T_s$ is obtained from the following expression:

$$\frac{T_{s\sigma}}{d_s} = \bar{\rho}_{s\sigma} + \alpha\sqrt{\bar{\rho}_{s\sigma}}. \qquad \text{(Eq. 6)}$$

In Equation 6, the quantity α is a non-negative, adjustable parameter, which we refer to as the compensation parameter. The more variable the call-arrival process, the greater the need for compensation, and thus the greater the value of α that is desirable. By way of example, we have found from theoretical analyses that a value for α of about 0.5 is useful for Poisson-distributed call arrivals, exponentially distributed call holding times, and critical loading of the network.

At block 100, the flow-based design procedure of FIG. 2, blocks 20 and 25, is carried out to obtain flow parameters $X_{sr}$. The elements $T_{s,\sigma}$ obtained at block 95 are used as input to the flow-based design procedure.

At block 105, the load $\rho_{sr}$ for each route in the route set of the current stream is obtained from the following expression:

$$\frac{\rho_{sr}}{\bar{\rho}_{s\sigma}} = \frac{X_{sr}}{T_{s\sigma}}. \qquad \text{(Eq. 7)}$$

As indicated at blocks 110 and 115, the procedures of blocks 95–105 are repeated for each stream, in turn, until there are none left. Then, as indicated at block 120, an evaluation can be made of the expected network performance by, for example, using known methods based on the stochastic network model to calculate the loss probability on each service route. If any of these predicted loss probabilities are too high, adjustments can be made to the compensation parameter α, or to other parameters used in the methods described above.

Figure 5:
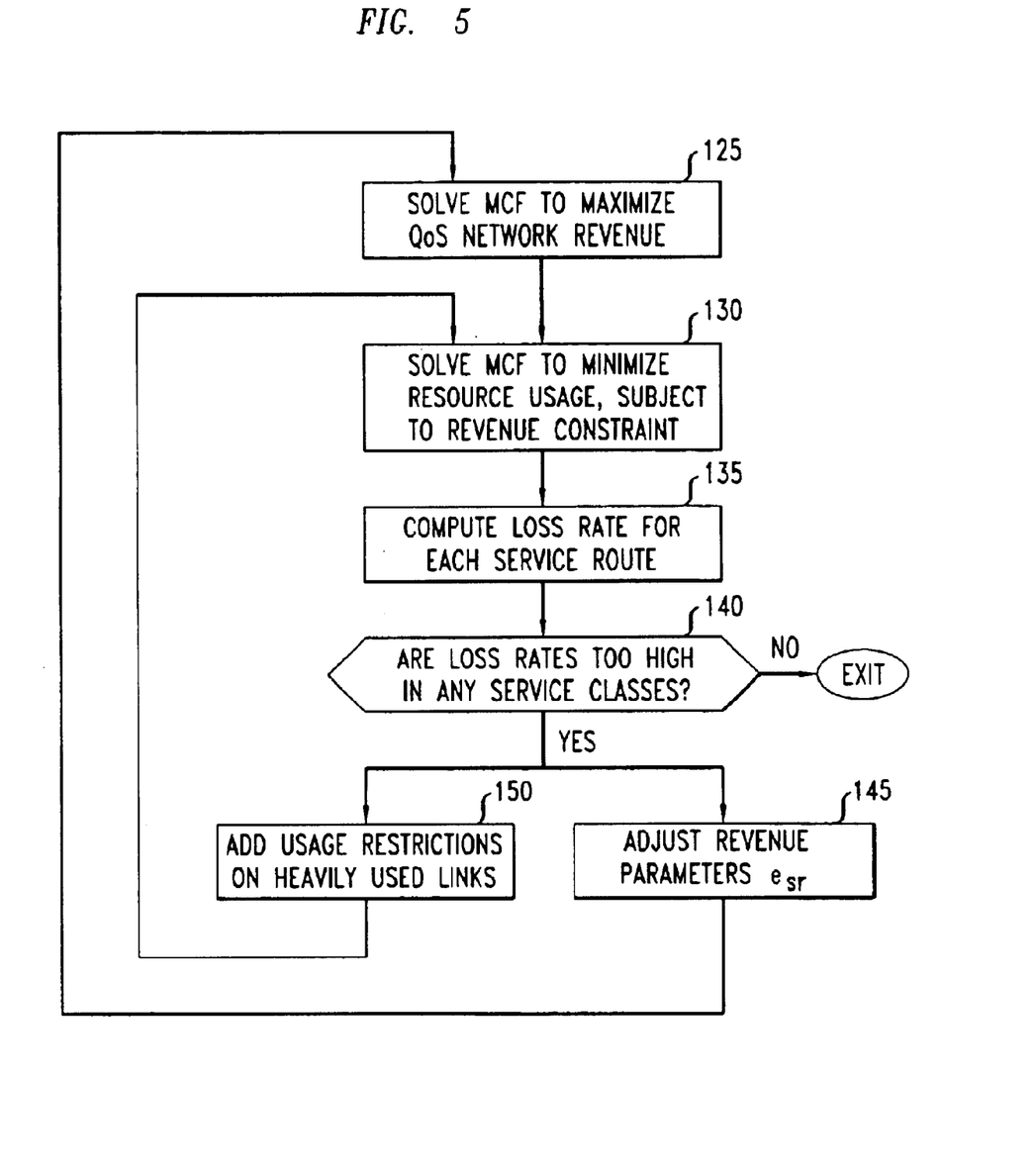
FIG. 5 is a flowchart of a traffic engineering procedure directed to QoS traffic, and including evaluation and adjustment processes.

FIG. 5 summarizes the traffic engineering procedure for QoS traffic. Blocks 125 and 130 are analogous to blocks 20 and 25 of FIG. 2, but may incorporate the stochastically based refinements described here in reference to FIG. 4. At block 135, a theoretical loss rate is computed for each service route. At block 140, an indication is made if the predicted loss rate is too high in any service class.

Blocks 145 and 150 represent alternative, illustrative pathways for revising the traffic engineering design to reduce unwanted losses. At block 145, the revenue parameters $e_{sr}$ that are input to the MCF problems are revised. Because the network revenue is maximized in the first MCF problem and maintained at the optimal level in the second MCF problem, an increase in earnings attributable to a given stream will tend to reduce blocking of traffic for that stream.

At block 150, additional constraints are added to the MCF problem of block 130. The nature of these constraints is to limit the usage on particular, heavily used links, to some fraction of total capacity. Thus, the object of this MCF problem is now to find a minimum amount of resource usage, consistent with the revenue constraint and the limitations on usage of particular links. By reserving some capacity in these links, it is possible to avoid overloading them during periods of relatively high activity.

One issue in network design that is gaining in importance is that of virtual private networks (VPNs). A VPN is a logically defined network consisting of bandwidth on each of various links that is allocated to a particular customer. When the traffic engineering techniques described here are applied to a network that supports one or more VPNs, the problem may arise as to how to accommodate the bandwidth requirements of the VPNs.

We have considered a solution to that problem that will be useful in at least some cases. According to our solution, demands between a given source-destination pair, in a given service class, are treated in the aggregate, even if some of these demands are earmarked for various VPNs. Then, after the flow parameters $X_{sr}$ or loads $\rho_{sr}$ have been obtained, these quantities are allocated among the VPNs and the non-VPN traffic.

Disaggregation takes place in two steps. First, the total flow on each route (for a given stream) is divided between non-VPN traffic and VPN traffic in direct proportion to the contributions made by non-VPN demand and VPN demand to the total demand. Then, the aggregated VPN flow is distributed among the various VPNs according to their respective shares.

We have considered two exemplary procedures for determining the respective shares of the various VPNs. According to one procedure, the share of each VPN stands in direct proportion to that VPN's contribution to the total demand. According to a second procedure, the well-known method of heuristic bin packing is applied to determine each VPN's share. This second procedure is especially useful if it is an ojective to route each VPN's demand on a single route.

Very briefly, heuristic bin packing begins by ordering the VPNs in decreasing order by the size of their respective demands. The demand associated with the first VPN is assigned to a route that has sufficient capacity. If no route has sufficient capacity, then as much demand as possible is assigned to a single route, and the VPN takes a new place in the ordering, determined by the size of the remaining, unassigned demand. The procedure then repeats, routing demand associated with the new VPN that is first in order.

EXAMPLE

Figure 1:
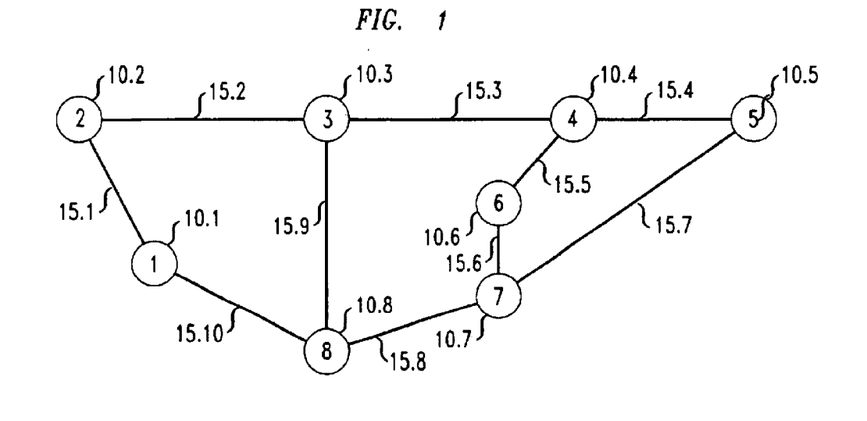
FIG. 1 is a schematic diagram of an illustrative communication network comprising links and nodes.

We performed theoretical analyses based on the network of FIG. 1. Each of links 15.1–15.10 is actually a pair of directed links, one in each direction. Each directed link has a bandwidth of 155 Mbps, referred to here as one OC3 unit, except that links 15.3 and 15.8 have capacities, in each direction, of two OC3 units. The service classes are voice (class 1), video (class 2), premium data (class 3), and best effort (class 4). The route sets for classes 1 and 2 are limited to minimum-hop routes. The route set for class 3 is limited to routes of 4 hops or less. The route set for the best effort class is unrestricted. The demand matrices for the four service classes are obtained by multiplying the matrix of Table 1 by 0.4, 0.1, 0.25, and 0.25, respectively. The total demands for the four services classes are 563.5, 140.9, 352.2, and 352.2, respectively.

TABLE 1

| *** | 15.7 | 18.1 | 2.7 | 23.5 | 13.1 | 5.3 | 7.9 |
|---|---|---|---|---|---|---|---|
| 18.3 | *** | 70.1 | 8.4 | 90.4 | 39.2 | 15.6 | 23.5 |
| 20.8 | 72.7 | *** | 10.4 | 96.4 | 46.8 | 18.1 | 26.8 |
| 2.7 | 8.4 | 7.9 | *** | 10.6 | 5.3 | 2.7 | 2.7 |
| 28.7 | 96.3 | 101.6 | 13.2 | *** | 62.3 | 23.5 | 39.2 |
| 13.1 | 36.4 | 41.6 | 5.3 | 54.9 | *** | 10.4 | 15.6 |
| 5.2 | 13.1 | 15.6 | 2.7 | 20.8 | 10.4 | *** | 5.3 |
| 7.9 | 20.8 | 26.0 | 2.7 | 31.2 | 15.6 | 5.3 | *** |

TABLE 1-continued

The procedures of FIG. 2, blocks 20 and 25 were carried out. In the resulting solution, all bandwidth demands were carried. Then, the full procedure of FIG. 2 was carried out. In the resulting solution, the total carried best-effort bandwidth was 279.4 Mbps. Thus, 20.5% of best-effort bandwidth was lost.

Minimization of QoS resource usage in block 25 of FIG. 2 led to total resource usage by QoS classes of 2120 Mbps-hops. The corresponding capacity of the residual network was 10.3 OC3 units. For comparison, we also maximized QoS resource usage. The total maximized usage was 2668 Mbps-hops, corresponding to a capacity in the residual network of 2.85 OC3 units.

We also applied the stochastic refinement of FIG. 4, and calculated loss probabilities in the stochastic model. For these purposes, the effective bandwidth of individual calls in service classes 1, 2, and 3 was 16 Kbps, 640 Kbps, and 384 Kbps, respectively.

For zero compensation, the total bandwidth demand $$\sum_{s,\sigma} \bar{\rho}_{s\sigma}$$

was 1056.3 Mbps, the total carried QoS-assured bandwidth $$\sum_{s,\sigma} \sum_{r \in R(s,\sigma)} \rho_{sr} d_s (1 - L_{sr})$$

was 1042.2 Mbps, and the network-wide loss probability was 0.0134. In the preceding expression for carried bandwidth, the quantity $L_{sr}$ is the loss probability for service route (s, r).

For $\alpha=0.5$, the total bandwidth demand was 978.8 Mbps, the total carried QoS-assured bandwidth was 976.0 Mbps, and the network-wide loss probability was 0.003.

For $\alpha=1.0$, the total bandwidth demand was 901.3 Mbps, the total carried QoS-assured bandwidth was 901.2, and the network-wide loss probability was 0.0001.

The invention claimed is:

1. A method for allocating bandwidth to routes through a packetized communication network that comprises nodes interconnected by links, each said route connecting a source node to a destination node, the method comprising:

a) for each of one or more classes s of service, to be referred to as QoS classes, finding an initial allocation of at least some demanded bandwidth among permissible routes that optimizes a figure of merit W of network performance, the optimized value to be denoted W*;

b) for each of said QoS classes, finding a further allocation of at least some of said demanded bandwidth among permissible routes, wherein: (i) the further allocation is made so as to satisfy a criterion for limiting resource usage by the network while maintaining the figure of merit W at or near its optimized value W*, and (ii) the further allocation leads to a set of flow parameters $X_{sr}$, each flow parameter representing an amount of bandwidth in QoS class s allocated to a respective route r;

c) identifying unallocated bandwidth capacity, if any, on each link of the network, said unallocated link capacities to be referred to, collectively, as a residual network; and d) for at least one further class of service, to be referred to as a BE class, determining a set of routes, and an allocation of at least some of said demanded bandwidth among said routes, that optimize a further figure of merit $W_{BE}$ of network performance.

2. The method of claim 1, wherein the step of finding an initial allocation of demanded bandwidth comprises solving a linear programming problem.

3. The method of claim 2, wherein the step of finding a further allocation of demanded bandwidth comprises solving a linear programming problem directed to minimizing a measure of resource usage by the network.

4. The method of claim 3, wherein the linear programming problems of steps (a) and (b) are multicommodity flow problems.

5. The method of claim 3, wherein the figure of merit W is network revenue from QoS service.

6. The method of claim 3, wherein the figure of merit $W_{BE}$ is network revenue from BE service.

7. The method of claim 3, wherein step (d) comprises:

solving a link-based multicommodity flow problem, thereby to determine, for each pertinent pair consisting of a source node and a destination node, bandwidth allocations on individual links; and performing a flow decomposition, thereby to determine bandwidth allocations on respective routes connecting each of said pertinent pairs.

8. The method of claim 3, wherein:

for at least one QoS class, the permissible routes in steps (a) and (b) are a predetermined, proper subset of all possible routes; and step (d) is carried out without an a priori restriction on permissible routes.

9. The method of claim 3, further comprising, before step (a), computing a bandwidth demand $T_{s\sigma}$ in each QoS class's for each pertinent pair consisting of a source node and a destination node.

10. The method of claim 9, wherein each demand $T_{s\sigma}$ is computed from at least one value of an effective bandwidth, and from a mean value $\bar{\rho}_{s\sigma}$ of stream traffic intensity in the pertinent QoS class between the pertinent source-destination pair σ.

11. The method of claim 10, wherein each demand $T_{s\sigma}$ is computed so as to satisfy the relation $$\frac{T_{s\sigma}}{d_s} = \bar{\rho}_{s\sigma} + \alpha\sqrt{\bar{\rho}_{s\sigma}},$$

wherein $d_s$ is an effective bandwidth in the pertinent QoS class, and α is a non-negative parameter.

12. The method of claim 11, further comprising computing a service-route traffic intensity value $\rho_{sr}$ for each route r in each QoS class s from corresponding values of the flow parameter $X_{sr}$, the demand $T_{s\sigma}$, and the mean stream traffic intensity $\bar{\rho}_{s\sigma}$.

13. The method of claim 12, wherein each service-route traffic intensity value $\rho_{sr}$ is computed so as to satisfy a relation of the form $$\frac{\rho_{sr}}{\bar{\rho}_{s\sigma}} = \frac{X_{sr}}{T_{s\sigma}}.$$

14. The method of claim 12, further comprising:

for each route r in each QoS class s, applying a stochastic traffic model to predict a rate at which calls offered to such route will be blocked due to insufficient link capacity;

identifying routes, if any, for which the blocking rate is unacceptably high;

for each route r in a given service class s that has an unacceptably high blocking rate, adjusting the value of a parameter $e_{sr}$ that expresses the contribution of such route, in such service class, to the figure of merit W of network performance, wherein said adjustment is carried out at least once, and is carried out so as to reduce the pertinent blocking rate; and at least once, repeating steps (a) and (b) using the adjusted values of the parameters $e_{sr}$.

15. The method of claim 12, further comprising:

for each route r in each QoS class s, applying a stochastic traffic model to predict a rate at which calls offered to such route will be blocked due to insufficient link capacity;

identifying routes, if any, for which the blocking rate is unacceptably high;

for each route r in a given service class s that has an unacceptably high blocking rate, selecting a limit on the total amount of bandwidth that can be allocated in step (b) on said route r in said QoS class s, wherein said selection is carried out at least once, and is carried out so as to reduce the pertinent blocking rate; and at least once, repeating step (b) subject to the selected limit.

16. The method of claim 12, wherein:

the method further comprises receiving demands to route calls between given source-destination pairs σ in one or more given QoS classes s, each such pair σ in association with a corresponding QoS class to be referred to as a stream (s, σ);

each stream (s, σ) has a respective set $\Re(s, \sigma)$ of permissible routes;

for each stream (s, σ), a set of flow parameters $X_{sr}$ and a set of service-route traffic intensity values $\rho_{sr}$ are determined for respective routes r in the pertinent route set $\Re(s, \sigma)$; and the method further comprises offering calls to the routes in $\Re(s, \sigma)$, according to such of said demanded bandwidth as has been allocated to each such route, in proportion to the respective service-route traffic intensity values $\rho_{sr}$.

17. The method of claim 16, wherein the step of offering calls to the routes $\Re(s, \sigma)$ comprises setting weight coefficients in a weighted fair queueing router, and for each stream (s, σ), the weight coefficients are made proportional to the respective service-route traffic intensity values $\rho_{sr}$.

18. The method of claim 3, wherein:

the method further comprises receiving demands to route calls between given source-destination pairs σ in one or more given QoS classes s, each such pair σ in association with a corresponding QoS class to be referred to as a stream (s, σ);

each stream (s, σ) has a respective set $\Re(s, \sigma)$ of permissible routes;

for each stream (s, σ), a set of flow parameters $X_{sr}$ is determined for respective routes r in the pertinent route set $\Re(s, \sigma)$; and the method further comprises offering calls to the routes in $\Re(s, \sigma)$, according to demanded bandwidth, in proportion to the respective flow parameters $X_{sr}$.

19. The method of claim 18, wherein the step of offering calls to the routes in $\Re(s, \sigma)$ comprises setting weight coefficients in a weighted fair queueing router, and for each stream, the weight coefficients are made proportional to the respective flow parameters $X_{sr}$.

20. The method of claim 1, wherein, for at least one service class s: the communication network supports one or more virtual private networks (VPNs), the demanded bandwidth includes demands related to at least one VPN, the allocation of demanded bandwidth to routes in service class s is initially carried out on an aggregation of demands that are VPN-related and demands that are not VPN-related; and the method further comprises:

dividing the allocated bandwidth on each permissible route in service class s into a portion for VPN traffic and a portion for non-VPN traffic according to the respective contributions of VPN-related demand and non-VPN-related demand to the total demand between the pertinent source and destination nodes in service class s.

21. The method of claim 20, further comprising distributing the VPN-traffic portion of the allocated bandwidth among two or more VPNs.

22. The method of claim 21, wherein allocated bandwidth is distributed among VPNs in proportion to the fraction of total demand associated with each VPN.

23. The method of claim 21, wherein allocated bandwidth is distributed among VPNs by heuristic bin packing.

24. A method for allocating bandwidth to routes through a packetized communication network that comprises nodes interconnected by links, the method comprising:

a) for each of one or more classes s of service, computing a bandwidth demand $T_{s\sigma}$ for each pertinent pair a consisting of a source node and a destination node; and b) for each said node pair σ, allocating at least some of the bandwidth demand $T_{s\sigma}$ over a set of permissible routes connecting said node pair σ, such that each resulting allocation in service class s on a route r is represented by a flow parameter $X_{sr}$, wherein:

c) each demand $T_{s\sigma}$ is computed from at least one value of an effective bandwidth, and from a mean value $\bar{\rho}_{s\sigma}$ of traffic intensity in class s between node pair σ, said traffic intensity to be referred to as traffic intensity of a stream (s, σ).

25. The method of claim 24, wherein each demand $T_{s\sigma}$ is computed so as to satisfy the relation $$\frac{T_{s\sigma}}{d_s} = \bar{\rho}_{s\sigma} + \alpha\sqrt{\bar{\rho}_{s\sigma}},$$

where $d_s$ is an effective bandwidth in service class s, and α is a non-negative parameter.

26. The method of claim 25, further comprising computing a service-route traffic intensity value $\rho_{sr}$ for each route r in each service class s from corresponding values of the flow parameter $X_{sr}$, the demand $T_{s\sigma}$, and the mean stream traffic intensity $\bar{\rho}_{s\sigma}$.

27. The method of claim 26, wherein each service-route traffic intensity value $\rho_{sr}$ is computed so as to satisfy a relation of the form $$\frac{\rho_{sr}}{\bar{\rho}_{s\sigma}} = \frac{X_{sr}}{T_{s\sigma}}.$$

28. The method of claim 26, wherein the method further comprises receiving demands to route calls between given source-destination pairs σ in one or more given service classes s, each such pair σ in association with said service class s to be referred to as a stream (s, σ);

each stream (s, σ) has a respective set $\Re(s, \sigma)$ of permissible routes;

for each stream, a set of flow parameters $X_{sr}$ and a set of service-route traffic intensity values $\rho_{sr}$ are determined for respective routes r in the pertinent route set $\Re(s, \sigma)$; and the method further comprises offering calls to the routes in $\Re(s, \sigma)$ according to demanded bandwidth, in proportion to the respective service-route intensity values $\rho_{sr}$.

29. The method of claim 28, wherein the step of offering calls to the routes in $\Re(s, \sigma)$ comprises setting weight coefficients in a weighted fair queuing router, and for each stream, the weight coefficients are made proportional to the respective service-route traffic intensity values $\rho_{sr}$.

30. The method of claim 24, wherein, for at least one service class s: the communication network supports one or more virtual private networks (VPNs), the demanded bandwidth includes demands related to at least one VPN, the allocation of demanded bandwidth to routes in service class s is initially carried out on an aggregation of demands that are VPN-related and demands that are not VPN-related; and the method further comprises:

dividing, the allocated bandwidth on each permissible route in service class s into a portion for VPN traffic and a portion for non-VPN traffic according to the respective contributions of VPN-related demand and non-VPN-related demand to the total demand between the pertinent source and destination nodes in service class s.

31. The method of claim 30, further comprising distributing the VPN-traffic portion of the allocated bandwidth among two or more VPNs.

32. The method of claim 31, wherein allocated bandwidth is distributed among VPNs in proportion to the fraction of total demand associated with each VPN.

33. The method of claim 31, wherein allocated bandwidth is distributed among VPNs by heuristic bin packing.

* * * * *